United States Patent [19]

Bossler, Jr.

[11] Patent Number: 5,135,442
[45] Date of Patent: Aug. 4, 1992

[54] GEAR ARRANGEMENT FOR TRANSMITTING TORQUE THROUGH AN ANGLE

[75] Inventor: Robert B. Bossler, Jr., Hacienda Heights, Calif.

[73] Assignee: Lucas Western, Inc., City of Industry, Calif.

[21] Appl. No.: 478,677

[22] Filed: Feb. 12, 1990

[51] Int. Cl.$^5$ .......................... F16H 37/06; F16H 1/14
[52] U.S. Cl. ........................................ 475/1; 475/343; 74/665 B; 74/665 GB; 74/665 C
[58] Field of Search ................. 475/1, 5, 331, 332, 475/343; 74/661, 664, 665 A, 665 B, 665 C, 665 GB, 665 H, 416, 417, 402, 406, 410; 267/283

[56] References Cited

U.S. PATENT DOCUMENTS

| | | | |
|---|---|---|---|
| 25,497 | 9/1859 | Faught | 475/343 |
| 2,238,380 | 4/1941 | Almen | 267/283 |
| 2,479,406 | 8/1949 | Rapuano | 74/661 |
| 2,749,764 | 6/1956 | Chou | 74/416 |
| 3,129,608 | 4/1964 | Watson | 74/665 C |
| 3,225,615 | 12/1965 | Little | 74/416 |
| 3,871,248 | 3/1975 | Barish | 74/417 X |
| 3,977,632 | 8/1976 | Watson | 74/661 X |
| 4,479,619 | 10/1984 | Saunders et al. | 74/665 B X |
| 4,489,625 | 12/1984 | White | 74/665 B X |
| 4,744,263 | 5/1988 | Kuiken | 74/462 |
| 4,983,153 | 1/1991 | Luijten | 475/343 |

FOREIGN PATENT DOCUMENTS 8503488  7/1987  Netherlands .

OTHER PUBLICATIONS

Rieger, R. et al., "Developments of Gears for Aircrafts", VDI-Z, vol. 113, No. 2 (Feb. 1971), pp. 127-136.

Primary Examiner—Leslie A. Braun
Assistant Examiner—Daniel Wittels
Attorney, Agent, or Firm—Pretty, Schroeder, Brueggemann & Clark

[57] ABSTRACT

A gear arrangement includes a horizontally inclined rotary shaft having a pinion and two face gears rotating in parallel but axially spaced planes. The two face gears are in meshing engagement with the pinion. Each face gear rotates about a shaft that includes a spur gear. A combining gear is in meshing engagement with both spur gears. Torque from the rotary shaft is equally split between the two face gears, reducing the amount of torque each face gear must transmit. The torque is combined from the two face gears by the combining gear, where the torque may then be used to drive the desired mechanism.

12 Claims, 4 Drawing Sheets

GEAR ARRANGEMENT FOR TRANSMITTING TORQUE THROUGH AN ANGLE

BACKGROUND OF THE INVENTION

1. Field of the Invention

This invention relates generally to a gear arrangement for transmitting torque through an angle, and more particularly to a gear arrangement using a pair of face gears as torque dividers to transmit power from a spur gear-type pinion through an angle.

2. Description of the Related Art

A variety of gear arrangements have been used for transmitting torque through an angle, or around a corner. For example, a gear arrangement employing a spur gear and a face gear is often used. A spur gear is a gear wheel with straight radial teeth on its circumference, the teeth edges being parallel to the axis of rotation. A face gear is a gear wheel having an axis of rotation perpendicular to that of the spur gear and having teeth on its face along the wheel periphery, the teeth being radially directed toward the center of the wheel. The spur gear acts as a pinion, driving or being driven by the larger face gear. Because the small spur gear has fewer teeth than the face gear, the spur gear turns with greater speed, but with less torque. The ratio between the number of teeth, resulting in the difference in speed between the gear wheels, is referred to as the speed reduction ratio.

Bevel gears are used to transmit torque through a 90° angle. Bevel gears comprise gear wheels with straight teeth that mesh at an angle. Spiral bevel gears have curved teeth that also mesh at an angle and can transfer a greater amount of torque than a spur gear and face gear combination or straight bevel gears of comparable size. Spiral bevel gears, for example, are used in a typical automobile differential to transmit torque from a drive shaft to a rear axle. Spiral bevel gears are also used in conventional helicopter transmissions, where torque from the drive shaft of a longitudinally disposed engine must be turned through an angle of approximately 90° to drive the rotor.

While spiral bevel gears are especially suited for transmitting torque through an angle, they do have drawbacks. Spiral bevel gears are extremely sensitive to changes in the relative location of the gears. Thus, spiral bevel gears are adversely effected by small amounts of thermal growth during operation and deflections of the gear supporting structure under load. The gears may not maintain optimum meshing through changes in temperature and deflections of the supporting structure. Because of this sensitivity to changes in the relative position of the gears, spiral bevel gears are more readily suited to low speed reduction ratios (ratios seldom greater than two to one) and are less suited to high speed reduction ratios (greater than four to one). The sensitivity to minute changes in relative position requires a heavy and complex support structure for spiral bevel gears. Such sensitivity also means that spiral bevel gears require complex manufacturing, assembly, and gear mating procedures.

In contrast, gear arrangements using a spur gear-type pinion and a face gear are much more forgiving of changes in relative size and position. The pinion can move in and out freely along its axis of rotation, within the limits of the length of its teeth, without negative effects on meshing with the face gear. Furthermore, a spur gear pinion has more tolerance for movement toward or away from its driven face gear than does an equivalent spiral bevel gear arrangement. Thus, gear arrangements using a spur gear and face gear are relatively unaffected by the thermal growth and deflection of the supporting structure experienced in many applications. For this reason, such gear arrangements easily accommodate speed reduction ratios greater than four to one. When high speed reduction ratios are required, such as for a helicopter drive, a two-stage transfer is often used. A spiral bevel gear stage is used to transfer the torque, ordinarily with less than a two-to-one transfer ratio, and a spur gear or planetary gear stage is used for the remaining speed reduction. While this is not as compact as a single stage, it does allow exploitation of the advantages of both types of gears.

In addition to sensitivity to thermal growth and deflections, spiral bevel gears do not exhibit conjugate action. A lack of conjugate action means that the velocity of the driven gear experiences minute acceleration and deceleration as the teeth go through meshing engagement, and manifests itself as objectionable noise and vibration. Spur/face gear combinations exhibit true conjugate action. Therefore, for a spur/face gear combination, the velocity of the driven gear remains constant as the teeth go through meshing engagement, resulting in relatively quiet and vibration free operation.

Thus, there is a need for a compact gear arrangement that can transmit large torque through an angle while accommodating thermal growth and deflection of the supporting structure, with reduced vibration and noise, and at high speed reduction ratios. Such a gear arrangement would provide the high torque transfer associated with spiral bevel gears and the conjugate action and tolerance of relative movement and thermal growth associated with conventional spur/face gear combinations.

SUMMARY OF THE INVENTION

The present invention provides a gear arrangement having a rotating generally horizontal shaft with a spur gear-type pinion in meshing engagement with two face gears rotating in the same direction in parallel but axially spaced planes. Each face gear in turn has a rotating, generally vertical shaft with a spur gear, with both of the spur gears in meshing engagement with a combining gear. The combining gear rotates in a plane parallel to the face gears, at an angle to the rotating horizontal shaft. When the pinion is the driving gear, the face gears act as torque splitters, each face gear transmitting roughly equal amounts of torque from the rotating horizontal shaft, reducing the amount of torque each face gear must transmit. This allows the gear arrangement to transmit a larger total torque than could a pinion with a single face gear, thereby providing a higher torque transfer capability than conventional spiral bevel gears. At the same time, because a spur/face gear arrangement is used, the gear combination exhibits true conjugate action. Therefore, high speed reduction ratios of four-to-one and greater can be used, and operation is relatively smooth and quiet. When the pinion is being driven by the face gears, the two face gears effectively combine their respective torque and transmit it to the pinion.

The gear arrangement in accordance with the present invention provides a very efficient coupling that transmits torque through an angle, is simple to manufacture and assemble, and is tolerant of thermal changes and deflections under load. The gear arrangement can accommodate high speed reduction ratios and is smooth and quiet in operation. The high speed reduction ratios enable the transfer of power without an extra combining stage or speed reduction stage, which would be necessary with conventional spiral bevel gears. The opposing gear mesh forces from the two face gears serve to locate the pinion, and therefore the only structural support required for the pinion is a light-force centering spring. This spring readily permits positional adjustments as the pinion finds its operating center through thermal changes and deflection under load, and can be provided by a simple leaf spring arrangement.

The novel gear arrangement of the present invention provides a savings in weight, structural dimension, power loss, and cost as compared with conventional gear arrangements for transmitting torque through an angle. For example, a conventional helicopter transmission requires a four-stage speed reduction design. The present invention allows the helicopter transmission to be designed with a three-stage speed reduction design. The reduced number of stages provides a savings in size and weight over the four-stage design. The elimination of one speed reduction stage also reduces the power loss through the transmission. All of these contribute to a savings in cost over, for example, a conventional four-stage design helicopter transmission.

Further features and advantages of the present invention will become apparent from the following description of a preferred embodiment, taken in conjunction with the accompanying drawings, which illustrate by way of example the principles of the invention.

BRIEF DESCRIPTION OF THE DRAWINGS

A preferred embodiment of the invention is illustrated in the accompanying drawings, wherein like reference numerals refer to like elements.

DESCRIPTION OF THE PREFERRED EMBODIMENT

The following description is of the best presently contemplated mode for carrying out the invention in the context of a helicopter transmission. This description is made for the purpose of demonstrating the general principles of the invention and is not to be taken in a limiting sense. The scope of the invention is best determined by reference to the appended claims, and equivalents thereof.

Figure 1:
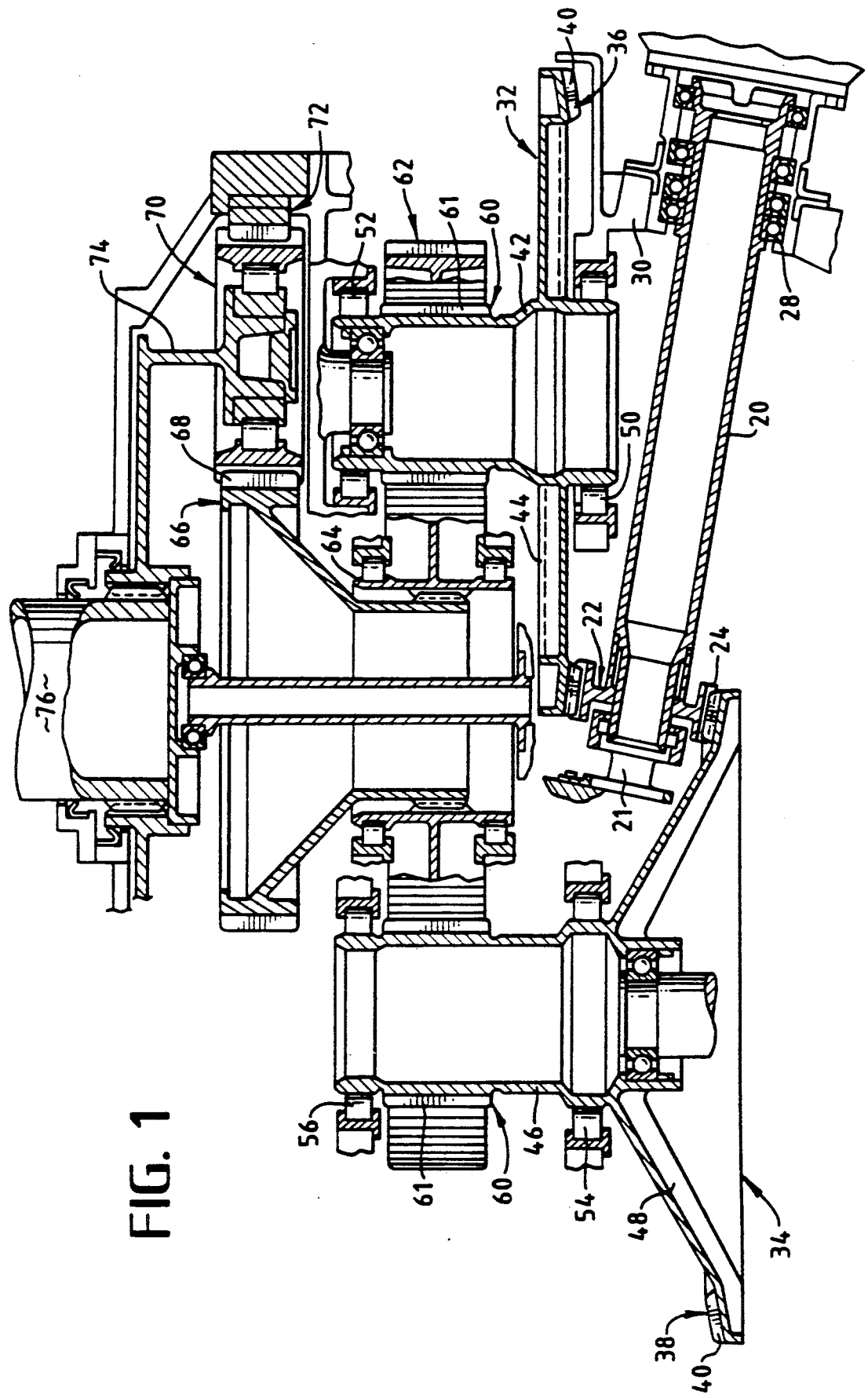
FIG. 1 is a cross-sectional view of a preferred embodiment of the present invention.

A helicopter transmission, constructed in accordance with the present invention and shown in FIG. 1, has a pinion shaft 20 extending from an engine (which is not shown) and a spur gear type pinion 22 at one end of the shaft that includes supporting flex beams 21. The spur gear has radial teeth 24 on its rim, with edges parallel to the axis of rotation. The opposite end of the shaft is connected to the output shaft of the engine and is partially supported in rotational motion by ball bearings 28 and a support arm 30.

As the pinion 22 rotates, it drives an upper face gear 32 and a lower face gear 34. The pinion and face gears are located such that the pinion meshes with the lower surface 36 of the upper face gear and the top surface 38 of the lower face gear. This exemplary pinion is provided with thirty-seven teeth. The engaging surfaces of both face gears have one hundred sixty-five teeth 40 whose edges are radially directed along the gear periphery, toward the center of the gear, and have a pitch so as to be in smooth meshing engagement with the pinion teeth 24. Alternatively, the face gears illustrated could be given different numbers of teeth, so long as they are both in meshing engagement with the pinion. The exemplary ratio of 165/37 for the face gear teeth to the pinion teeth provides a drive transfer ratio, or speed reduction, of greater than four-to-one. Thus, the pinion and face gears provide a spur/face gear arrangement that exhibits true conjugate action and accommodates high speed reduction ratios. Such an arrangement is also tolerant of thermal changes and deflections under load, and increases the quietness and smoothness of operation.

The upper face gear 32 rotates about an upper face gear shaft 42. The lower face gear 34 rotates about a lower face gear shaft 46. The shafts rotate about axes that are parallel but spaced-apart along the axis of the pinion 22 such that both shafts 42, 46 rotate in the same direction. The pinion shaft 20 actually passes beneath the upper face gear, as shown in FIG. 1. Thus, if the pinion 22 is the driving gear, torque from the pinion is split evenly between the face gears. Because both face gears have the same number of teeth and mesh with the pinion, the torque transferred by each gear is equally shared, and the gears can be smaller than if bevel gears or spur/face gears were used, thus providing savings in weight, structural requirements, power losses, and cost.

For maximum strength and reduced weight, the upper face gear 32 is constructed from high strength steel alloy and is provided with corrugations 44. For compact size of the transmission, the lower face gear 34 is constructed with a deep dish design. That is, the face gear teeth 38 are spaced axially apart from the location where the face gear meets the shaft 46. For high strength and light weight, the lower face gear is constructed with twelve spokes 48 extending from the shaft to the gear teeth.

The upper face gear shaft 42 is rotatably supported and positioned by a lower bearing 50 and an upper bearing 52. The lower face gear shaft 46 is rotatably supported and positioned by a lower bearing 54 and an upper bearing 56. Each gear shaft includes a spur-type gear 60 having thirty-one teeth 61. The edges of the teeth are longitudinally disposed parallel to the shaft axis of rotation. A ring-shaped combining gear 62 having one hundred sixty-three teeth on its outer periphery is in meshing engagement with the spur gears 60, and therefore serves to combine the torque from each of the face gears 32, 34. The torque from the pinion 22 is thus restored to a single rotating member, the combining gear. The combining gear could alternatively be provided with teeth on its inner periphery, depending on the particular application. The illustrated combining gear is of a flat dish design, rotating about a combining gear shaft 64. The combining gear shaft is splined to a bell-shaped planetary sun gear 66 that flares outwardly from the shaft, terminating in a plurality of teeth 68, with edges disposed parallel to the sun gear axis of rotation. In the illustrated embodiment, the sun gear has fifty-seven teeth, but those skilled in the art will appreciate that a different number of teeth may be provided depending on the application. The sun gear drives a planetary speed reducer, described more fully below.

Figure 2:
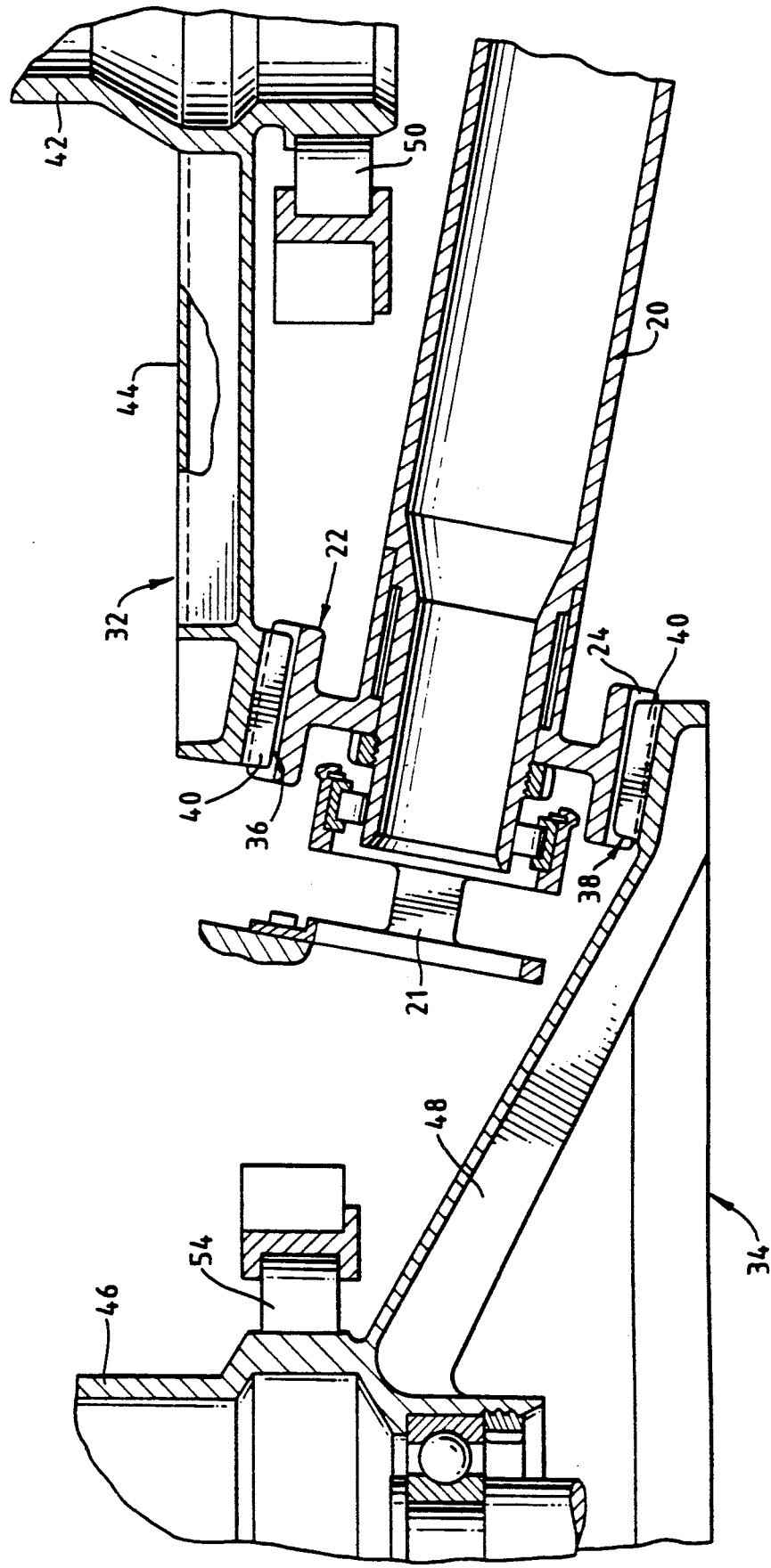
FIG. 2 is a cross-sectional enlarged detail view of the pinion of FIG. 1.

The teeth 40 of the upper face gear 32, while being straight and radially directed, are inclined at an angle to meet the teeth of the pinion 22, as best illustrated in FIG. 2. The pinion rotary shaft 20 rotates at an angle to the face gears because it must clear the lower support bearing 50 of the upper face gear. Alternatively, the radius of the pinion could be made larger so as to allow the shaft to clear the support bearing without inclination, but the larger pinion would result in an increase in weight. Flex beams 21, shown in FIG. 1 and FIG. 2, help to support and locate the end of the pinion rotary shaft. The flex beams are elongated flat strips of metal, or leaf springs, that allow the shaft end to move laterally, but not vertically, allowing for controlled deflections under load and also thermal expansion of the gears. These leaf springs are relatively weak, and allow the pinion to move such that the torque flow to each face gear is substantially equal. Thus, the face gears transmit roughly equal amounts of torque. The leaf springs do not need to be extremely strong because opposing gear forces will serve to locate the pinion 22 and the pinion rotary shaft 20.

Figure 3:
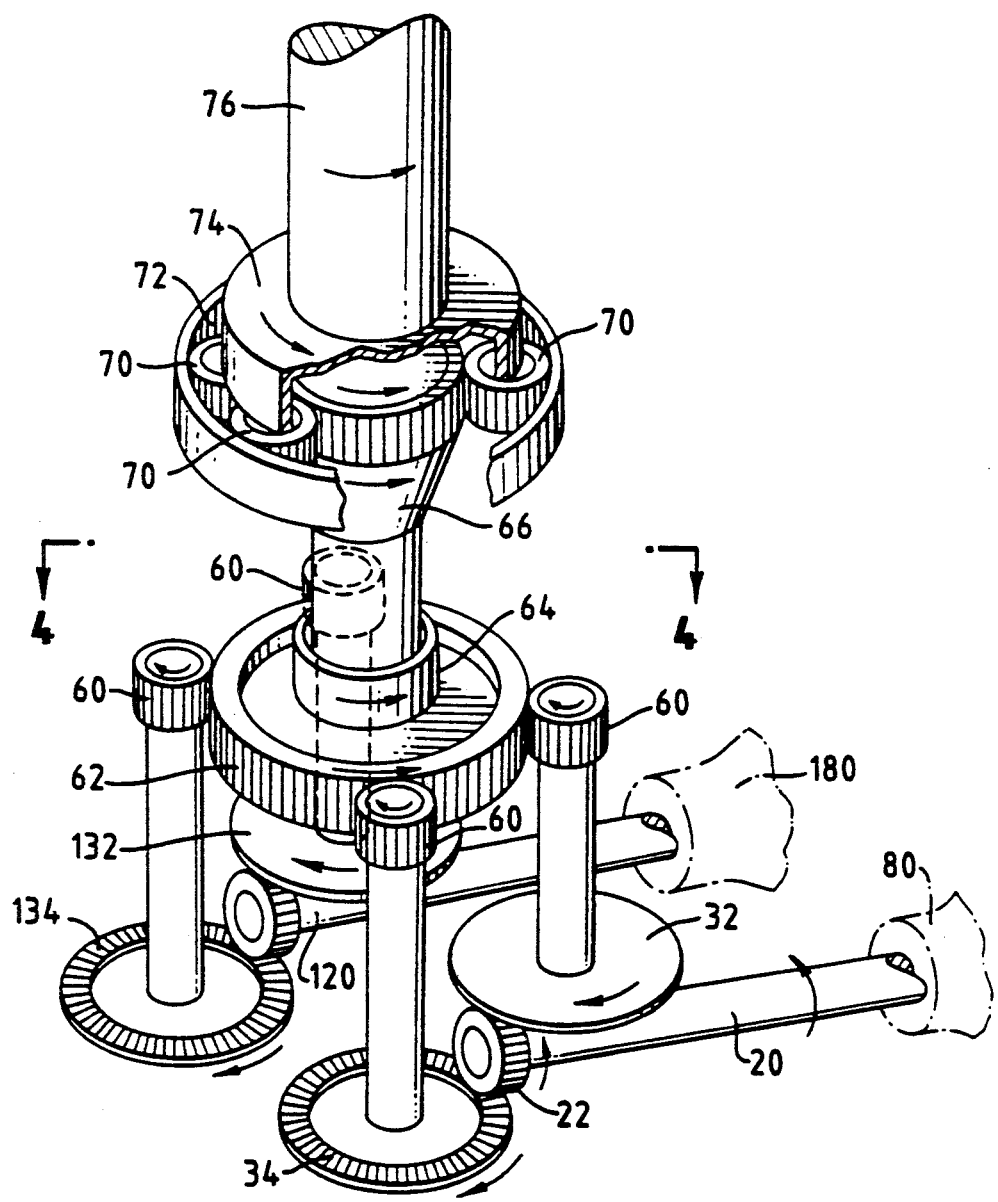
FIG. 3 is a perspective view of the apparatus of FIG. 1 of the present invention showing a twin engine helicopter transmission constructed in accordance with the principles of the present invention.
Figure 4:
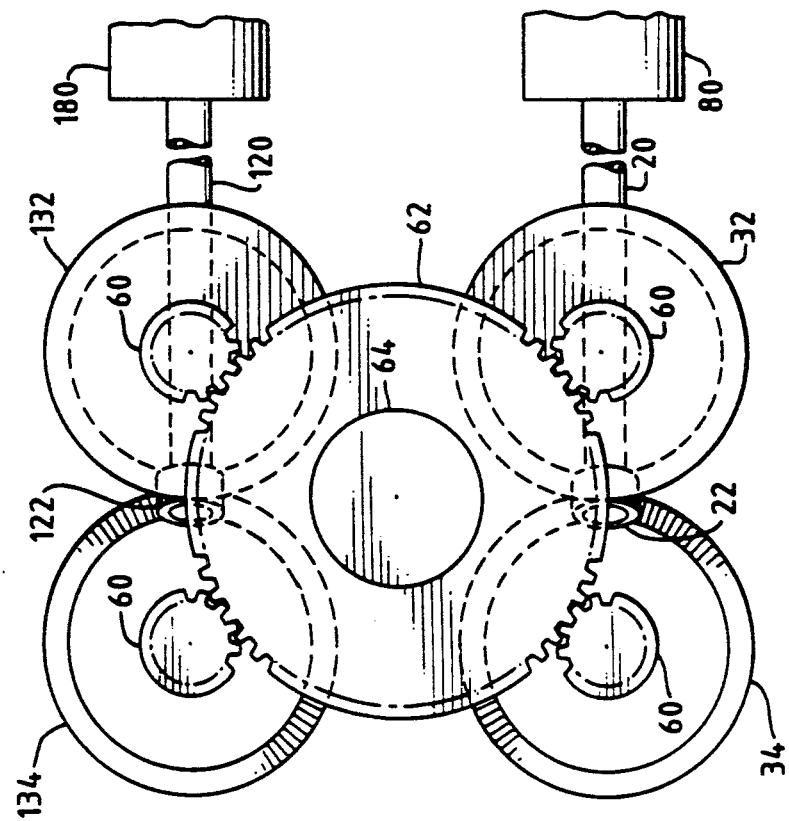
FIG. 4 is a plan view of the apparatus of FIG. 3.

In a helicopter transmission constructed in accordance with the present invention, shown in FIG. 3 and FIG. 4, there are two face gears 32, 34. This transmission is for a twin-engine design, demonstrating the flexibility of the present invention in accommodating a variety of drive configurations. A first helicopter engine 80 rotates the shaft 20, driving the face gears 32, 34. The spur gears 60 rotating with the face gears are in meshing engagement with the combining gear 62. As noted above, the combining gear is splined at its shaft 64 to a planetary sun gear 66 having fifty-seven teeth. The fifty-seven teeth mesh with eight planetary gears 70 that have thirty-one teeth and are supported from a planet carrier ring 74. The planetary gears mesh with a stationary outer ring gear 72, and transmit their torque through the carrier 74 and to an output shaft 76, thereby causing rotation of the helicopter rotor blades (not illustrated). Thus, the combining gear 62 effectively drives the sun gear 66 in a planetary gear combination.

A second helicopter engine 180 rotates a second drive shaft 120. The helicopter transmission includes a second set of face and spur gears that correspond to the gears associated with the first engine 80. Thus, the second transmission includes a second set of face gears 132, 134 and each one of these face gears includes a spur gear 60 that is in meshing engagement with the combining gear 62. In this way, the second engine and its associated gear wheels contribute to the rotation of the combining gear 62 and subsequently the helicopter rotor blades (not illustrated). Furthermore, the combining gear and therefore the rotor blades will still rotate even if one engine is inoperative, thereby increasing the survivability of the helicopter.

Figure 5:
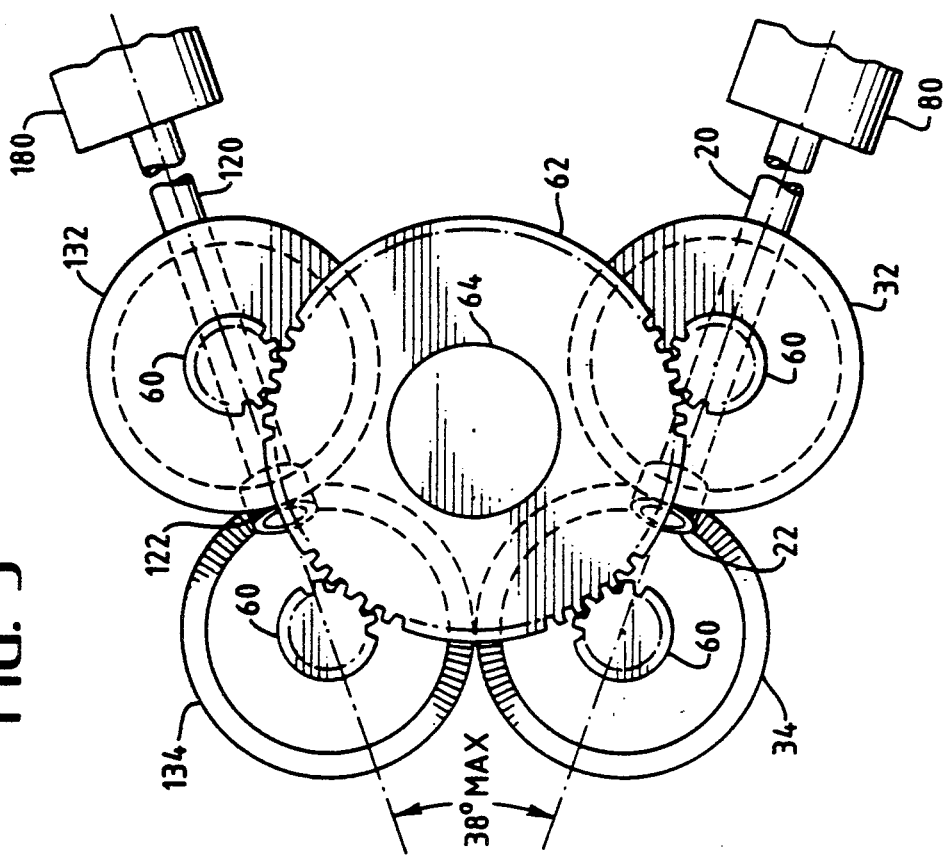
FIG. 5 is a plan view of an alternate configuration for the twin-engine transmission illustrated in FIG. 4.

If desired, the two helicopter engines may be placed at an angle to each other, rather than in the longitudinal orientation shown in FIG. 3 and FIG. 4. That is, each pair of face gears 32, 34 and 132, 134 may be moved along the circumference of the combining gear 62. For example, the first engine face gears 32, 34 may be rotated clockwise and the second engine face gears 132, 134 may be rotated counterclockwise, as illustrated in FIG. 5. This would place the engine drive shafts 20, 120 at an angle to each other, rather than along the parallel axes shown in FIG. 4. This may be desirable, for example, in consideration of air flow to the engines. For the particular gear sizes shown in FIG. 5, the maximum angle between the drive shafts 20, 120 is 38°. The configuration illustrated in FIG. 4 is the most compact, however, and therefore it is generally to be preferred.

Thus, the present invention provides an efficient, compact gear arrangement for transmitting torque through an angle using a pinion and two face gears. The torque is shared equally between the face gears, which rotate in the same direction. In this way, high speed reduction ratios of greater than four-to-one can be used without an extra reduction stage, while providing conjugate action and tolerance of lateral gear movement and thermal growth. The elimination of an extra speed reduction stage decreases the size and weight of the gear arrangement, and the conjugate action makes for smoother operation. Thus, a superior gear arrangement for transmitting torque through an angle is provided.

The present invention has been described in terms of a presently preferred embodiment in the context of a helicopter transmission so that an understanding of the present invention may be conveyed. There are, however, many configurations not specifically described herein, but with which the present invention is applicable. For example, the present invention may be used to couple airplane engines to a pair of rotating propellers such that only one engine must be running to rotate both propellers. Those skilled in the art will appreciate that spiral bevel gears are too large to be practical for such an application. In this way, the present invention can increase the efficiency and survivability of a variety of applications. The present invention should therefore not be seen as limited to the particular embodiment described herein, but rather, it should be understood that the present invention has wide applicability with respect to gear arrangements of many different configurations and materials. Such alternate configurations may be achieved by those skilled in the art in view of the description herein.

I claim:

1. A gear arrangement in combination with an engine, the arrangement comprising:
    a generally horizontally inclined rotary shaft coupled to the engine and having a pinion with teeth the edges of which are disposed parallel to the shaft axis of rotation;
    an upper face gear having a top surface and a bottom surface, further having radial teeth disposed along the periphery of the bottom surface in meshing engagement with the pinion;
    an upper face gear shaft, about which the upper face gear rotates, having an axis of rotation inclined from that of the rotary shaft;
    a first spur gear on the upper face gear shaft spaced longitudinally from the top surface;
    a lower face gear having a top surface and a bottom surface, further having radial teeth disposed along the periphery of the top surface in meshing engagement with the pinion;
    a lower face gear shaft, about which the lower face gear rotates, having an axis of rotation parallel to that of the upper face gear shaft;

a second spur gear on the lower face gear shaft spaced longitudinally from the lower face gear top surface; and a combining gear having an axis of rotation parallel to the axis of rotation of the upper face gear and lower face gear, the combining gear having teeth with edges parallel to the combining gear axis of rotation and in meshing engagement with both spur gears.

2. A gear arrangement as recited in claim 1, wherein the number of teeth on the upper face gear is equal to the number of teeth on the lower face gear.

3. A gear arrangement as recited in claim 1, wherein the generally horizontally inclined rotary shaft is supported by spring means for allowing controlled motion of the pinion as it moves to equalize the torque absorbed by the face gears.

4. A gear arrangement as recited in claim 1, wherein the generally horizontally inclined rotary shaft comprises a driving shaft that rotates the face gears.

5. A gear arrangement as recited in claim 1, wherein the combining gear teeth are disposed along the combining gear outer circumference.

6. A gear arrangement as recited in claim 1, wherein the combining gear teeth are disposed along the combining gear inner circumference.

7. A gear arrangement as recited in claim 1, wherein the combining gear further includes a rotary shaft about which the gear rotates.

8. A gear arrangement as recited in claim 7, further comprising a toothed sun gear coupled to the combining gear shaft and a plurality of toothed planetary gears in meshing engagement with the sun gear.

9. A gear arrangement as recited in claim 8, further comprising a ring gear having teeth disposed along its inner circumference in meshing engagement with the planetary gears.

10. A gear arrangement receiving torque from at least a first engine and transmitting the torque from a first rotary axis through an angle to a second rotary axis, the gear arrangement comprising:

a first rotary shaft coupled to the first engine and having a first pinion with teeth the edges of which are parallel to the axis of rotation;

first and second toothed face gears having adjacent tooth surfaces and rotatable in separate but first and second face gears rotating about axes parallel to the second rotary axis, the adjacent tooth surfaces being in meshing engagement with the first pinion;

first and second spur gears attached to the shafts of the first and second face gears, respectively; and a toothed combining gear in meshing engagement with the first and second spur gears.

11. A gear arrangement as recited in claim 10, further comprising:

a second rotary shaft coupled to a second engine and having a second pinion with teeth the edges of which are parallel to the second shaft axis of rotation;

third and fourth toothed face gears having adjacent tooth surfaces and rotatable in separate but parallel planes about respective shafts, the shafts of the third and fourth face gears rotating about axes parallel to the second rotary axis, the third and fourth face gear adjacent tooth surfaces being in meshing engagement with the second pinion; and third and fourth spur gears attached to the shafts of the third and fourth face gears, respectively, the third and fourth spur gears being in meshing engagement with the toothed combining gear.

12. A gear arrangement for receiving torque from an engine and transmitting the torque from a first rotary axis through an angle to a second rotary axis, the gear arrangement comprising:

a generally horizontally inclined rotary shaft coupled to an engine and having a pinion with teeth the edges of which are disposed parallel to the rotary shaft axis of rotation;

an upper face gear having a top surface and a bottom surface, further having radial teeth disposed along the periphery of the bottom surface in meshing engagement with the pinion;

an upper face gear shaft, rotatably supported by a bearing substantially at each end, axially supporting the face gear and having an axis of rotation inclined from that of the rotary shaft;

a first spur gear on the upper gear shaft spaced longitudinally from the top surface;

a lower face gear having a top surface and a bottom surface, and further having radial teeth disposed along the periphery of the top surface in meshing engagement with the pinion, the number of teeth being equal to the number of teeth on the upper face gear;

a lower face gear shaft, rotatably supported by a bearing substantially at each end, axially supporting the face gear and having an axis of rotation parallel to that of the upper face gear shaft;

a second spur gear on the lower gear shaft spaced longitudinally from the top surface;

a ring-shaped combining gear having an axis of rotation parallel to the axis of rotation of the upper face gear and lower face gear, the combining gear having teeth with edges parallel to the combining gear axis of rotation disposed along the combining gear outer circumference and in meshing engagement with both spur gears;

a combining gear shaft axially supporting the combining gear and defining the combining gear axis of rotation;

a toothed sun gear coupled to the combining gear shaft;

a plurality of toothed planetary gears in meshing engagement with the sun gear; and a ring gear whose inner circumference has a plurality of teeth with edges parallel to the combining gear axis of rotation and in meshing engagement with the planetary gears.

* * * * *